United States Patent
Elbkaily et al.

(10) Patent No.: US 10,214,243 B2
(45) Date of Patent: Feb. 26, 2019

(54) VEHICLE FRAME

(71) Applicant: Ford Global Technologies, LLC, Dearborn, MI (US)

(72) Inventors: Marwan Ahmad Elbkaily, Canton, MI (US); Tushar B. Kamble, Farmington, MI (US); Gururaj Aralikatti, Farmington, MI (US); Greg Gombert, Canton, MI (US); Benjamin Mansfield, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 57 days.

(21) Appl. No.: 15/646,502

(22) Filed: Jul. 11, 2017

(65) Prior Publication Data
US 2019/0016387 A1    Jan. 17, 2019

(51) Int. Cl.
B62J 7/00 (2006.01)
B62D 21/15 (2006.01)
B62D 21/02 (2006.01)

(52) U.S. Cl.
CPC .............. B62D 21/15 (2013.01); B62D 21/02 (2013.01)

(58) Field of Classification Search
CPC .......... B60G 2204/41; B60G 2204/422; B60G 2204/4306; B60G 5/047; B60R 19/02; H04N 19/61; H04N 19/107; H04N 19/20; H04N 19/17; H01L 2924/0002
USPC ................................................... 296/187.08
See application file for complete search history.

(56) References Cited

U.S. PATENT DOCUMENTS

| | | | | |
|---|---|---|---|---|
| 3,888,502 A | * | 6/1975 | Felzer ...................... | B60R 19/34 188/371 |
| 4,057,263 A | * | 11/1977 | Schwuchow ........ | B62D 21/152 280/797 |
| 4,272,114 A | * | 6/1981 | Hirano ...................... | F16F 7/12 188/377 |
| 4,684,151 A | * | 8/1987 | Drewek ............... | B62D 21/152 280/784 |
| 4,726,166 A | * | 2/1988 | DeRees ................... | B62D 21/02 52/694 |
| 4,848,835 A | * | 7/1989 | DeRees .................. | B62D 21/02 280/756 |
| 5,125,715 A | * | 6/1992 | Kijima .................. | B62D 21/152 293/132 |
| 5,267,772 A | * | 12/1993 | Ohta .................... | B62D 21/152 296/187.11 |
| 5,429,388 A | * | 7/1995 | Wheatley ............. | B62D 21/152 180/271 |
| 5,431,445 A | * | 7/1995 | Wheatley ............. | B62D 21/152 188/377 |

(Continued)

FOREIGN PATENT DOCUMENTS

| | | |
|---|---|---|
| CN | 104058007 A | 9/2014 |
| FR | 2986490 A1 | 8/2013 |

(Continued)

*Primary Examiner* — Kiran B Patel
(74) *Attorney, Agent, or Firm* — Frank A. MacKenzie; Bejin Bieneman PLC

(57) ABSTRACT

A vehicle frame includes two frame rails fixed relative to each other and each having a tubular shape defining an exterior surface and an interior surface, a crush-initiating notch on each exterior surface, and a reinforcement extending along each interior surface and positioned in a vehicle-rearward direction from the notches.

20 Claims, 6 Drawing Sheets

(56) References Cited

U.S. PATENT DOCUMENTS

| | | | | |
|---|---|---|---|---|
| 5,853,195 | A * | 12/1998 | Le | B62D 21/152 280/784 |
| 6,152,521 | A * | 11/2000 | Hayashi | B60R 19/24 296/187.09 |
| 6,165,588 | A * | 12/2000 | Wycech | B29C 44/18 293/109 |
| 6,174,009 | B1 | 1/2001 | McKeon | B60R 19/34 188/377 |
| 6,305,136 | B1 * | 10/2001 | Hopton | B29C 44/18 296/146.6 |
| 6,341,467 | B1 * | 1/2002 | Wycech | B29C 44/18 296/193.06 |
| 6,354,654 | B2 | 3/2002 | Lee | |
| 6,474,709 | B2 * | 11/2002 | Artner | B60R 19/34 293/133 |
| 6,705,668 | B1 * | 3/2004 | Makita | B62D 21/15 296/187.03 |
| 6,733,040 | B1 * | 5/2004 | Simboli | B62D 21/02 280/784 |
| 6,793,274 | B2 * | 9/2004 | Riley | B62D 21/152 296/187.03 |
| 6,802,522 | B1 * | 10/2004 | Park | B60D 1/243 280/495 |
| 7,063,376 | B2 * | 6/2006 | Ori | B62D 25/08 296/187.01 |
| 7,097,235 | B2 * | 8/2006 | Yasukouchi | B62D 21/152 296/187.03 |
| 7,104,597 | B2 | 9/2006 | Osato et al. | |
| 7,114,763 | B2 | 10/2006 | Riley et al. | |
| 7,226,121 | B2 * | 6/2007 | Dandekar | B62D 25/2018 296/204 |
| 7,243,981 | B2 * | 7/2007 | Park | B62D 21/152 280/784 |
| 7,389,860 | B2 * | 6/2008 | Abu-Odeh | B62D 21/15 188/376 |
| 7,407,192 | B2 * | 8/2008 | Yoshimura | B62D 21/155 280/124.109 |
| 7,578,545 | B2 * | 8/2009 | Fujikawa | B62D 21/152 296/187.08 |
| 7,695,052 | B2 * | 4/2010 | Nusier | B62D 21/152 293/133 |
| 8,292,019 | B2 * | 10/2012 | Hisazumi | B62D 21/15 180/274 |
| 8,490,988 | B2 * | 7/2013 | Takeshita | B62D 21/155 280/124.109 |
| 8,530,015 | B2 * | 9/2013 | Mendiboure | B62D 29/002 296/187.02 |
| 8,708,401 | B2 * | 4/2014 | Lee | B62D 21/152 280/124.109 |
| 8,807,597 | B2 * | 8/2014 | Akaki | B62D 21/02 180/232 |
| 8,857,894 | B2 * | 10/2014 | Grall | B60R 19/34 188/377 |
| 9,296,427 | B1 * | 3/2016 | Kim | B62D 25/082 |
| 9,701,344 | B2 * | 7/2017 | Kodama | B62D 21/152 |
| 9,751,565 | B2 * | 9/2017 | Tatsuwaki | B62D 21/155 |
| 9,821,853 | B2 * | 11/2017 | Torikawa | B62D 25/025 |
| 9,834,160 | B2 * | 12/2017 | Staines | B21D 39/026 |
| 2002/0174954 | A1 * | 11/2002 | Busseuil | B62D 25/00 156/349 |
| 2004/0119302 | A1 * | 6/2004 | Schambre | B60R 19/40 293/118 |
| 2006/0021697 | A1 * | 2/2006 | Riley | B62D 29/002 156/295 |
| 2006/0071508 | A1 | 4/2006 | Kim | |
| 2007/0187960 | A1 * | 8/2007 | Evans | B60R 19/18 293/133 |
| 2008/0054665 | A1 * | 3/2008 | Baccouche | B62D 21/152 296/3 |
| 2009/0315365 | A1 * | 12/2009 | Baccouche | B62D 21/152 296/205 |
| 2010/0026047 | A1 * | 2/2010 | Baccouche | B62D 21/152 296/187.09 |
| 2010/0133861 | A1 * | 6/2010 | Lutke-Bexten | B60R 19/18 293/120 |
| 2010/0194145 | A1 * | 8/2010 | Akaki | B62D 21/02 296/187.08 |
| 2011/0006560 | A1 * | 1/2011 | Honda | B62D 21/15 296/187.08 |
| 2015/0344073 | A1 * | 12/2015 | Midoun | B62D 21/155 296/187.1 |
| 2015/0360632 | A1 * | 12/2015 | Nishida | B62D 21/152 293/133 |
| 2016/0083013 | A1 * | 3/2016 | Fujihara | B62D 21/152 296/187.09 |
| 2016/0207573 | A1 * | 7/2016 | Kitakata | B62D 21/152 |
| 2018/0057063 | A1 * | 3/2018 | Tyan | B60R 19/34 |

FOREIGN PATENT DOCUMENTS

| | | |
|---|---|---|
| JP | 2009057030 A | 3/2009 |
| JP | 201343562 A | 3/2013 |
| JP | 5299170 B2 | 9/2013 |

\* cited by examiner

VEHICLE FRAME

BACKGROUND

Motor vehicles may have a body-on-frame construction or a unibody construction. For a body-on-frame construction, a vehicle frame supports a body that is a separate component from the vehicle frame. The body covers and is attached to the vehicle frame. For a unibody construction, a chassis and a body of the vehicle are a single component.

DETAILED DESCRIPTION

Figure 1:
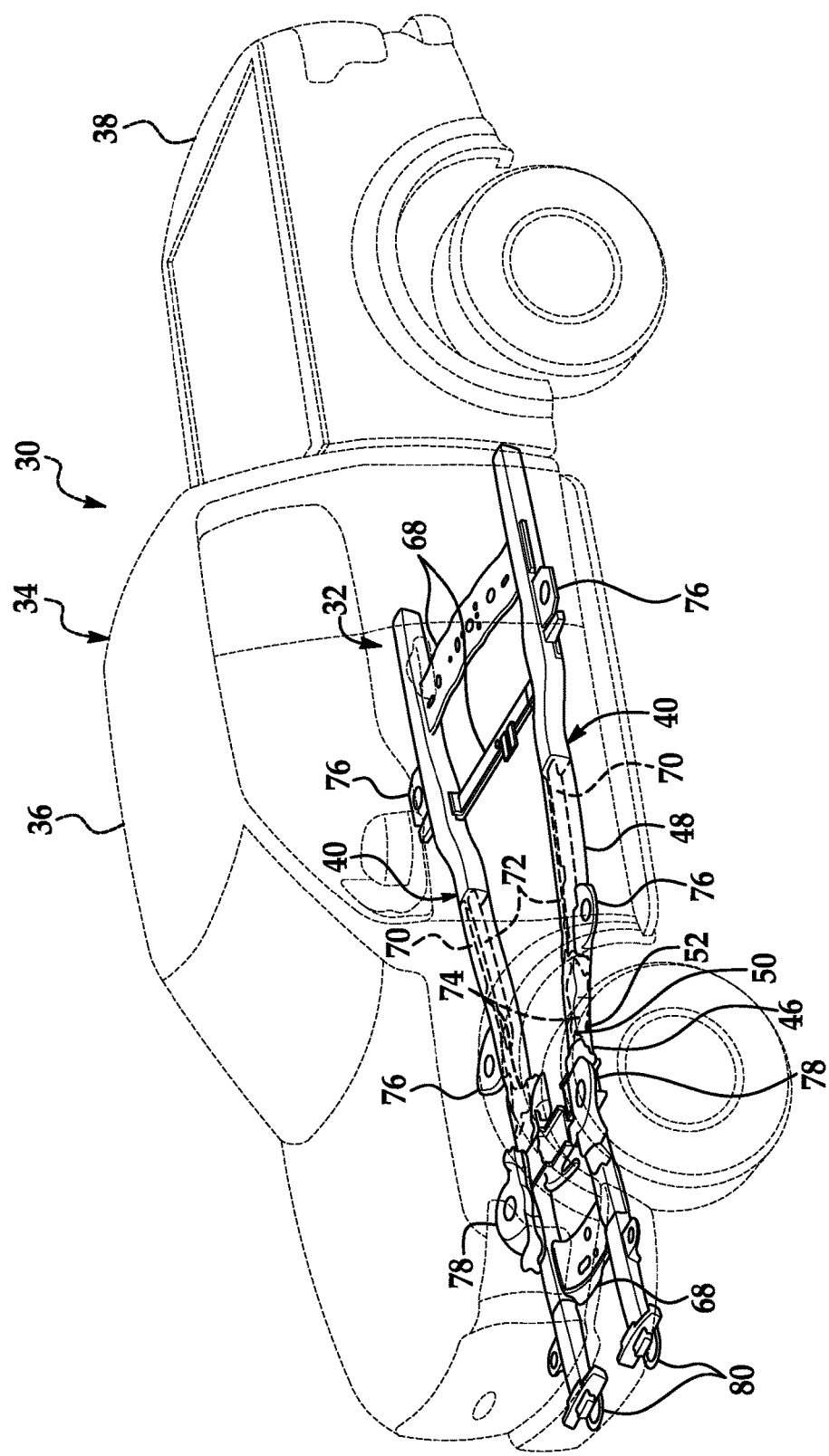
FIG. 1 is a perspective view of a vehicle.

A vehicle frame includes two frame rails fixed relative to each other and each having a tubular shape defining an exterior surface and an interior surface, a crush-initiating notch on each exterior surface, and a reinforcement extending along each interior surface and positioned in a vehicle-rearward direction from the notches.

The frame rails may each have a rounded rectangular cross-section including a top side, a bottom side, an inboard side, an outboard side, and corners connecting the sides. Each notch may be disposed on one of the corners. Each notch may be disposed on one of the corners bordering the outboard sides. Each reinforcement may extend along one of the corners. Each reinforcement may extend along one of the corners bordering the top sides. The notches may be first notches, and the vehicle frame may include a second notch on the exterior surface of both frame rails. Each first notch may be disposed on one of the corners bordering the corresponding top side and the corresponding outboard side, and each second notch may be disposed on one of the corners bordering the corresponding bottom side and the corresponding outboard side. Each first notch may be positioned in a vehicle-forward position from the second notch on the corresponding frame rail. The reinforcements may be first reinforcements, and the vehicle frame may include a second reinforcement extending along each interior surface positioned in the vehicle-rearward direction from the notches. Each first reinforcement may be disposed on one of the corners bordering the respective top side and the respective outboard side, and each second reinforcement may be disposed on one of the corners bordering the respective top side and the respective inboard side. Each first reinforcement may be positioned in a vehicle-outward direction from the second reinforcement of the corresponding frame rail.

The notches may extend through the walls of the frame rails.

The reinforcements may be positioned to limit deformation initiated by the notches during a collision.

Each frame rail may include a curved-upward section and a straight section extending in a vehicle-rearward direction from the curved-upward section, and each notch may be disposed on one of the curved-upward sections. Each reinforcement may be disposed on one of the straight sections.

The vehicle frame may include a cab mount bracket fixed to each frame rail in the vehicle-rearward direction from the notches. Each cab mount bracket may be positioned in a vehicle-outward direction relative to the corresponding reinforcement.

The frame rails may be farther apart in the vehicle-rearward direction from the notches than opposite the vehicle-rearward direction from the notches. A crossbeam may extend from one of the frame rails to the other of the frame rails and be positioned in the vehicle-rearward direction from the reinforcements.

The vehicle frame may prevent or reduce injuries to occupants of a vehicle. Specifically, in a frontal collision, the vehicle frame may reduce intrusion of an instrument panel or a footwell into a passenger cabin of the vehicle. The vehicle frame may thus reduce tibia load and/or femur load of occupants of a passenger cabin of the vehicle.

With reference to FIG. 1, the vehicle 30 may be a pickup truck. The vehicle 30 has a body-on-frame construction; in other words, the vehicle frame 32 supports a body 34 that is a separate component from the vehicle frame 32. If the vehicle 30 is a pickup truck, the body 34 may include a separate cab 36 and cargo bed 38 or be integral, that is, a single piece. The vehicle frame 32 may be formed of any suitably strong, stiff material, e.g., aluminum, steel, etc.

Figure 2:
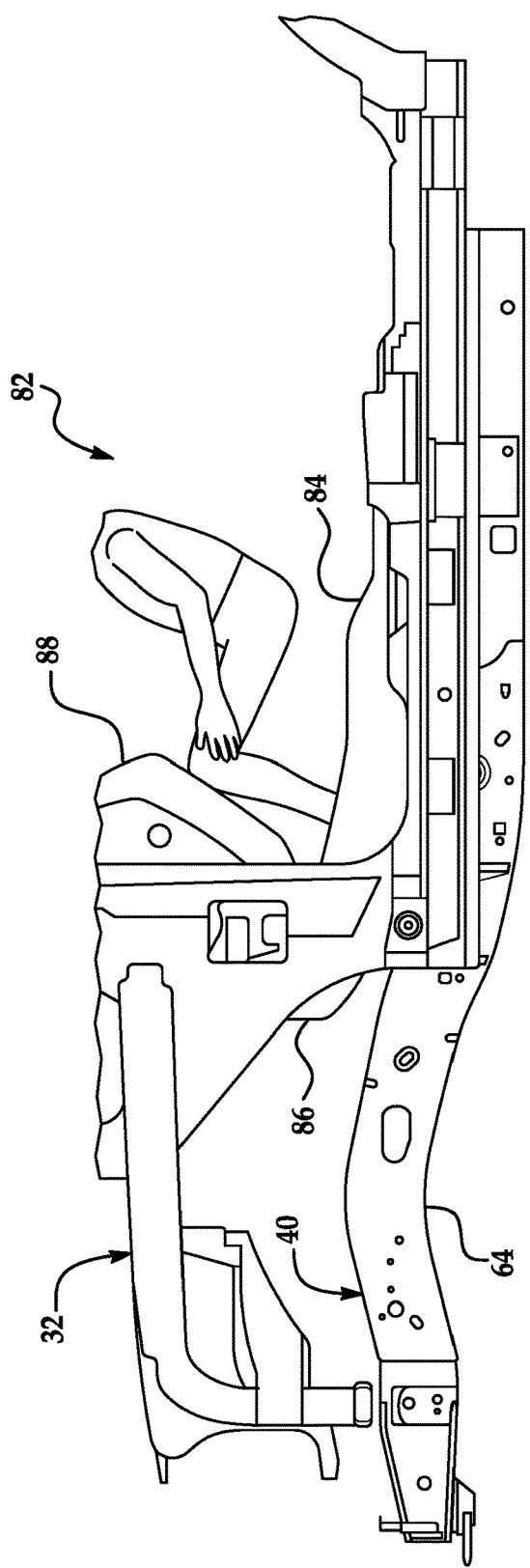
FIG. 2 is a side view of a frame of the vehicle.

With reference to FIG. 2, the cab 36 of the vehicle 30 includes a passenger cabin 82. The passenger cabin 82 houses occupants of the vehicle 30. The passenger cabin 82 is defined in part by a floor 84 including a footwell 86. The floor 84 extends along a bottom of the passenger cabin 82 and curves upward at the footwell 86 at a vehicle-forward end of the passenger cabin 82. The passenger cabin 82 includes an instrument panel 88 extending laterally across at a vehicle-forward end of the passenger cabin 82. The instrument panel 88 is disposed forward of occupants, if any, of the passenger cabin 82.

Figure 7:
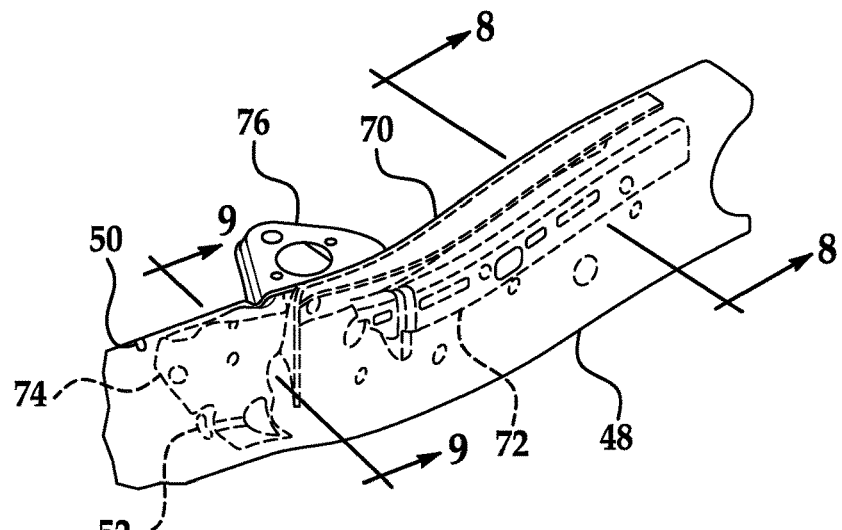
FIG. 7 is a perspective view of a different portion of the frame rail.

With reference to FIGS. 1-4, the vehicle frame 32 includes two frame rails 40 fixed relative to each other. The frame rails 40 extend in a generally longitudinal direction, that is, generally lengthwise with respect to the vehicle 30, that is, in a vehicle-forward direction. Each frame rail 40 has a tubular shape, as shown in FIG. 7. Each frame rail 40 may have a uniform gauge, i.e., a uniform wall thickness. Each frame rail 40 may be composed of a frame-rail inboard section 42 and a frame-rail outboard section 44 attached together, e.g., welded together.

Figure 4:
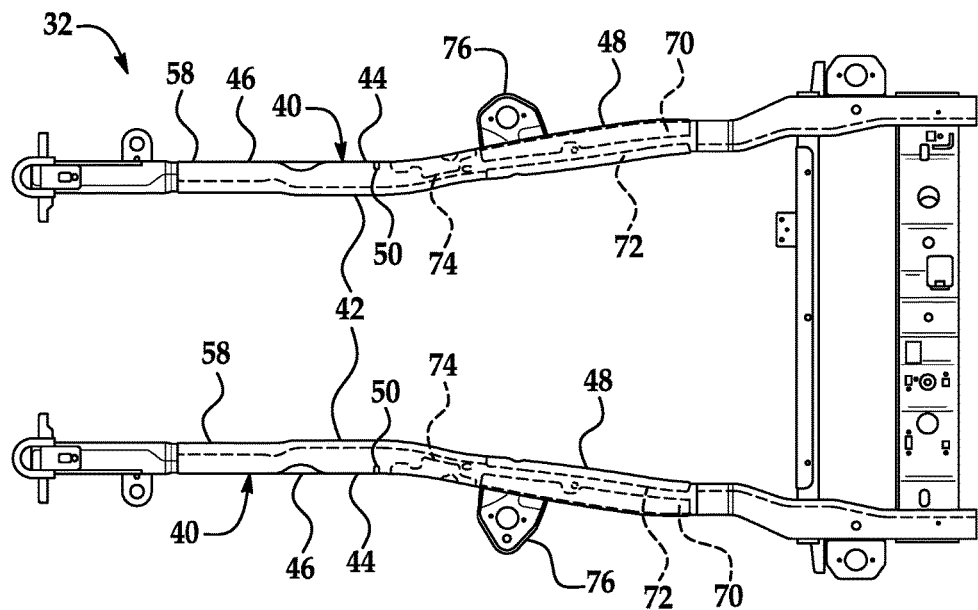
FIG. 4 is a top view of the frame.
Figure 5:
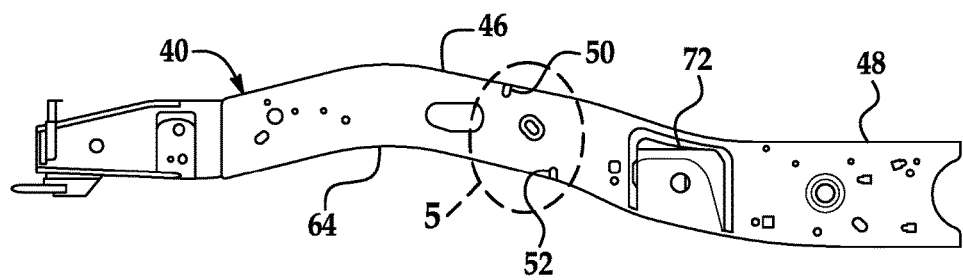
FIG. 5 is a side view of a frame rail of the frame.

With reference to FIGS. 4 and 5, each frame rail 40 includes a curved-upward section 46 and a straight section 48. The straight section 48 extends in a vehicle-rearward direction from the curved-upward section 46. The curved-upward section 46 has a convex side facing upward, that is, in a vehicle-upward direction, and the curved-upward section 46 has a concave side facing downward, that is, in a vehicle-downward direction. The curved-upward sections 46 extend generally parallel to each other longitudinally, i.e., in a vehicle-forward or vehicle-rearward direction. The curved-upward sections 46 are disposed forward of the passenger cabin 82. The straight sections 48 extend away from each other in a vehicle-rearward direction. The straight sections 48 may be disposed below the floor 84 of the passenger cabin 82. In other words, the frame rails 40 are farther apart in at the straight sections 48 that at the curved-upward sections 46. The frame rails 40 are farther apart behind, i.e., in the vehicle-rearward direction from, notches 50, 52 (described below) than forward, i.e., opposite the vehicle-rearward direction, from the notches 50, 52.

Figure 8:
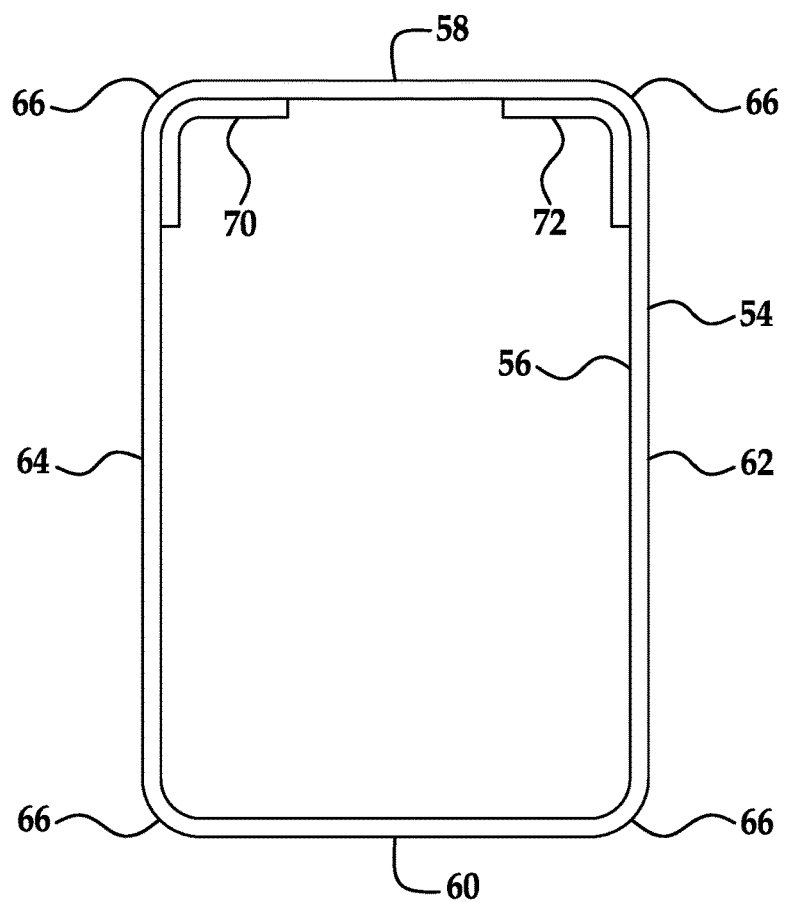
FIG. 8 is a cross-sectional view of the frame rail along line 8-8 in FIG. 7.
Figure 9:
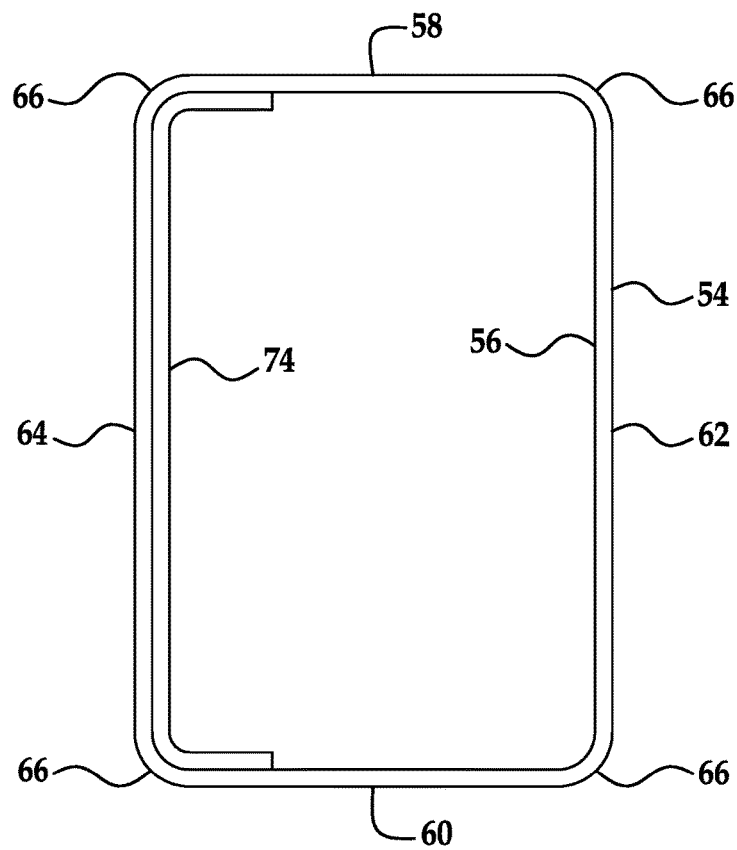
FIG. 9 is a cross-sectional view of the frame rail along line 9-9 in FIG. 7.

With reference to FIGS. 8 and 9, each frame rail 40 has a tubular shape defining an exterior surface 54 and an interior surface 56. The frame rails 40 each have a rounded rectangular cross-section including a top side 58, a bottom side 60, an inboard side 62, an outboard side 64, and corners 66 connecting the sides 58, 60, 62, 64. In other words, the sides 58, 60, 62, 64 are substantially straight, and the corners 66 connecting the sides 58, 60, 62, 64 are rounded, e.g., have a semicircular shape. The top side 58 faces in a vehicle-upward direction; the bottom side 60 faces in a vehicle-downward direction; the inboard side 62 faces toward a middle of the vehicle 30; and the outboard side 64 faces away from the middle of the vehicle 30.

Figure 3:
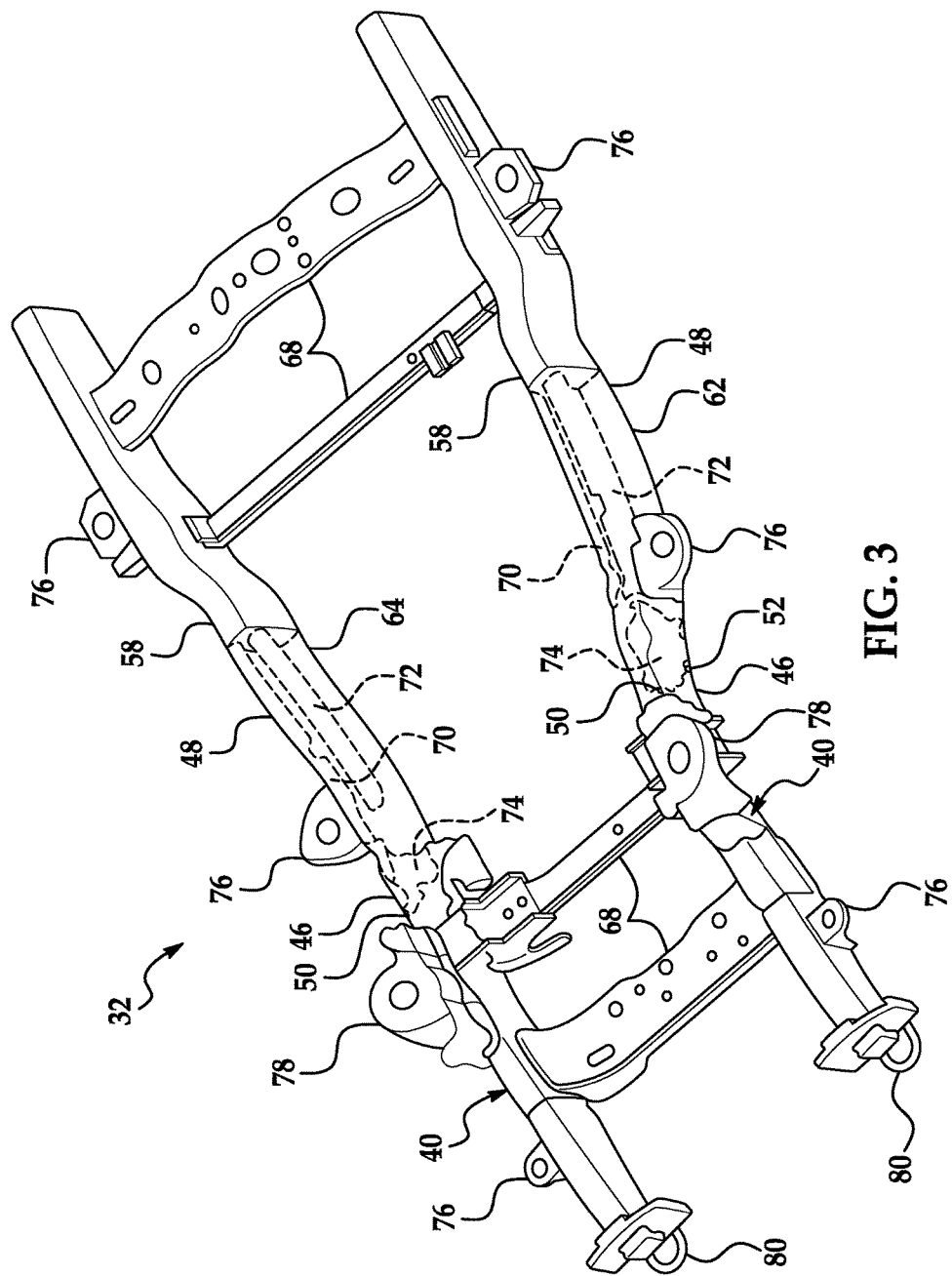
FIG. 3 is a perspective view of the frame.

With reference to FIGS. 3 and 4, crossbeams 68 extend from one of the frame rails 40 to the other of the frame rails 40. The crossbeams 68 extend substantially laterally, i.e., in a vehicle-leftward or vehicle-rightward direction. The crossbeams 68 are attached, e.g., welded to the frame rails 40. At least one of the crossbeams 68 is positioned behind, i.e., in the vehicle-rearward direction, from the straight sections 48. At least one of the crossbeams 68 is positioned behind, i.e., in the vehicle-rearward direction from, reinforcements 70, 72, 74 (described below).

With reference to FIGS. 3-5 and 7, cab mount brackets 76 are fixed, e.g., welded, to each frame rail 40. The cab mount brackets 76 are fixed to the exterior surface 54 on the outboard side 64 of each frame rail 40. The cab mount brackets 76 are positioned behind, that is, in the vehicle-rearward direction from, the notches 50, 52. The cab mount brackets 76 are positioned laterally, i.e., in a vehicle-outboard direction, from the reinforcements 70, 72, 74. The body 34, specifically, the cab 36, is attached to the vehicle frame 32 via the cab mount brackets 76. The cab mount brackets 76 may be shaped like a platform facing up on which the cab 36 may be placed. The cab 36 may be fastened or bolted to the cab mount brackets 76.

With reference to FIGS. 1 and 4, the vehicle frame 32 may include shock tower brackets 78. The shock tower brackets 78 may accept shocks (not shown) of a suspension system of the vehicle 30. The shock tower brackets 78 may be attached to the frame rails 40. The shock tower brackets 78 may be disposed on the exterior surface 54 of the frame rails 40 on the outboard sides 64. The shock tower brackets 78 may be attached to the frame rails 40 on the curved-upward sections 46.

With reference to FIGS. 1, 3, and 4, tow hooks 80 may be attached to the frame rails 40 at front ends, that is, at vehicle-forward ends. Each tow hook 80 may have a U-shape.

Figure 6:
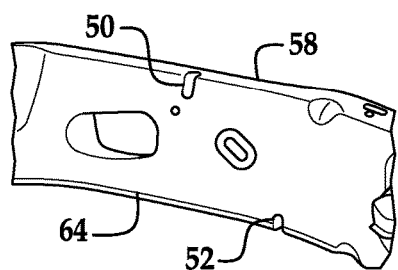
FIG. 6 is a perspective view of a portion of the frame rail.

With reference to FIGS. 5 and 6, the notches 50, 52 are located on the exterior surfaces 54 of the frame rails 40. The notches 50, 52 may be holes, i.e., may extend through walls of the frame rails 40, i.e., extend from the exterior surface 54 to the interior surface 56. Alternatively, the notches 50, 52 may be indentations into the frame rails 40, that is, deviations from the rounded rectangular cross-section of the frame rails 40 that extend inwardly, i.e., toward a center of the tubular shape of the frame rail 40.

Each notch 50, 52 is disposed on one of the curved-upward sections 46. The notches 50, 52 include first notches 50 and second notches 52. (The adjectives "first," "second," etc. are used throughout this document as identifiers and are not intended to signify importance or order.) One first notch 50 and one second notch 52 may be disposed on each frame rail 40. Each first notch 50 on one of the frame rails 40 may be positioned forward of, i.e., in a vehicle-forward position from, the second notch 52 on that frame rail 40. The notches 50, 52 are disposed forward of, i.e., in a vehicle-forward direction from, the reinforcements 70, 72, 74. The notches 50, 52, may be disposed in forward of, i.e., in a vehicle-forward direction from, the footwell 86, the instrument panel 88, and the passenger cabin 82.

With continued reference to FIGS. 5 and 6, each notch 50, 52 is disposed on one of the corners 66 of the frame rails 40. Specifically, each notch 50, 52 may be disposed on one of the corners 66 bordering the outboard sides 64 of the frame rails 40. More specifically, each first notch 50 for one of the frame rails 40 may be disposed on one of the corners 66 of the frame rail 40 bordering the corresponding top side 58 and the corresponding outboard side 64 of the frame rail 40, and each second notch 52 for one of the frame rails 40 may be disposed on one of the corners 66 of the frame rail 40 bordering the corresponding bottom side 60 and the corresponding outboard side 64 of the frame rail 40. Each notch 50, 52 extends through the corresponding corner 66 and may extend to one or both of the sides 58, 60, 62, 64 bordering that corner 66.

With reference to FIGS. 3, 4, and 7-9, the reinforcements 70, 72, 74 are positioned on the frame rails 40 behind, i.e., in a vehicle-rearward direction, from the notches 50, 52. Each reinforcement 70, 72, 74 is positioned on one of the straight sections 48 of the frame rail 40. The reinforcements 70, 72, 74 include first reinforcements 70, second reinforcements 72, and third reinforcements 74. The first and second reinforcements 70, 72 are positioned laterally from the footwell 86.

The reinforcements 70, 72, 74 extend along the interior surfaces 56 of the frame rails 40. Each reinforcement 70, 72, 74 extends longitudinally, i.e., in vehicle-forward or vehicle-rearward direction, on one of the interior surfaces 56 along one of the corners 66 of one of the frame rails 40. Specifically, each reinforcement 70, 72, 74 extends along one of the corners 66 bordering the top sides 58. More specifically, each first reinforcement 70 for one of the frame rails 40 is disposed on one of the corners 66 bordering the respective top side 58 and the respective outboard side 64 of that frame rail 40, and each second reinforcement 72 for one of the frame rails 40 is disposed on one of the corners 66 bordering the respective top side 58 and the respective inboard side 62 of that frame rail 40. Each first reinforcement 70 is positioned in a vehicle-outboard direction from the second reinforcement 72 of the corresponding frame rail 40. Each third reinforcement 74 of one of the frame rails 40 is disposed in a vehicle-forward direction from the corresponding first reinforcement 70 on one of the corners 66 bordering the respective top side 58 and the respective outboard side 64 of that frame rail 40. Each third reinforcement 74 for one of the frame rails 40 may extend along the interior surface 56 of one of the outboard sides 64 and one of the corners 66 bordering the respective outboard side 64 and the respective bottom side 60 of that frame rail 40.

With continued reference to FIGS. 3, 4, and 7-9, the first reinforcements 70 and the second reinforcements 72 extend longitudinally and have a generally L-shaped cross-section. Each first or second reinforcement 70, 72 extends along one of the corners 66 and may extend to one or both of the sides 58, 62, 64 bordering that corner 66. The third reinforcements 74 extend longitudinally and have a generally C-shaped cross-section. Each third reinforcement 74 extends along one of the sides 58, 60, 62, 64 and the corners 66 bordering that side, and that third reinforcement 74 may extend along one or both of the other sides 58, 60, 62, 64 bordering those corners 66. The reinforcements 70, 72, 74 may have a gauge, i.e., a wall thickness of between 2.5 millimeters and 3.5 millimeters, e.g., 3.0 millimeters.

The reinforcements 70, 72, 74 may be formed of any suitably strong material. For example, the reinforcements 70, 72, 74 may be formed of high-strength low-alloy steel, e.g., HSLA350.

The notches 50, 52 are crush-initiating notches. In other words, if the frame rails 40 are under compressive stress, e.g., during a vehicle impact, the frame rails 40 will yield, i.e., deform, adjacent to the notches 50, 52 before yielding elsewhere along the frame rails 40. Phrased another way, the compressive stress at which a section of the frame rail 40 begins to yield is lower for a section having the notches 50, 52 than for a section lacking the notches 50, 52. The reinforcements 70, 72, 74 are positioned to limit deformation initiated by the notches 50, 52 during a collision. In other words, if the frame rails 40 begin to yield adjacent to the notches 50, 52, that yielding will extend elsewhere on the frame rails 40 than where the reinforcements 70, 72, 74 are positioned before extending to where the reinforcements 70, 72, 74 are positioned on the frame rails 40. Phrased another way, the compressive stress at which a section of the frame rail 40 begins to yield is higher for a section having the reinforcements 70, 72, 74 than for a section lacking the reinforcements 70, 72, 74.

Figure 10:
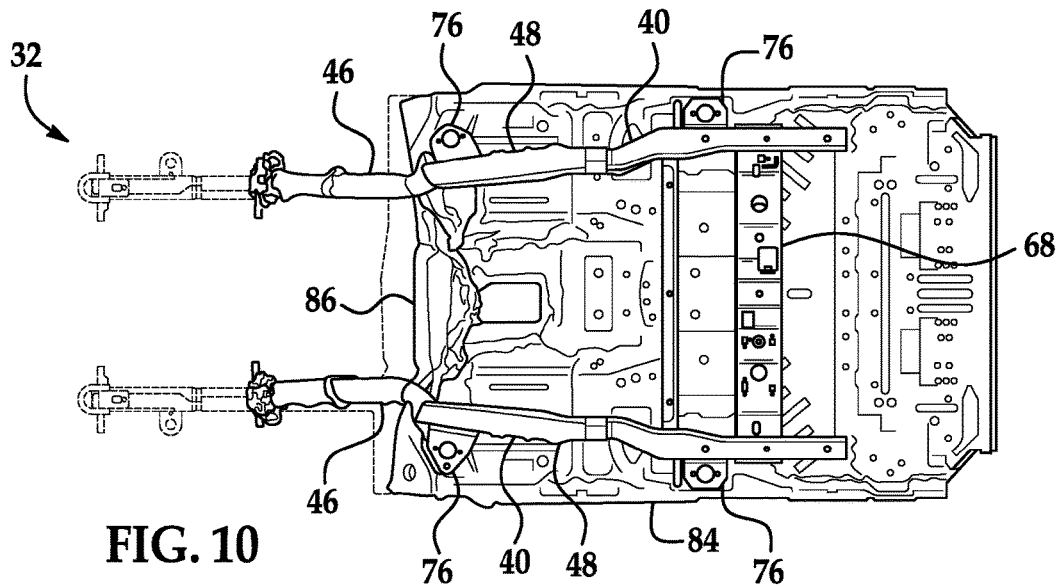
FIG. 10 is a bottom view of the frame of the vehicle after a frontal impact.

In the event of a frontal collision of sufficient magnitude, the frame rails 40 begin to yield adjacent to the notches 50, 52. The curvature of the curved-upward sections 46 may concentrate the compressive stress on the frame rail onto the notches 50, 52. The yielding may cause the frame rails 40 to buckle along the curved-upward sections 46. Because the straight sections 48 flare out laterally from the curved-upward sections 46, the buckling of the frame rails 40 may be directed laterally inboard, reducing the deformation extending in a vehicle-rearward direction. The reinforcements 70, 72, 74 may prevent or reduce deformation along the straight sections 48. As shown in FIG. 10, the deformation caused by the frontal collision may be therefore focused forward of the passenger cabin 82 and reduced within the passenger cabin 82. Intrusion of the instrument panel 88 and/or the footwell 86 into the passenger cabin 82 may be reduced, which may reduce tibia load and/or femur load for occupants of the vehicle 30.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle frame comprising:
   two frame rails fixed relative to each other and each having a tubular shape defining an exterior surface and an interior surface;
   a crush-initiating notch on each exterior surface; and
   a reinforcement extending along each interior surface and positioned in a vehicle-rearward direction from the notches.

2. The vehicle frame of claim 1, wherein the frame rails each have a rounded rectangular cross-section including a top side, a bottom side, an inboard side, an outboard side, and corners connecting the sides.

3. The vehicle frame of claim 2, wherein each notch is disposed on one of the corners.

4. The vehicle frame of claim 3, wherein each notch is disposed on one of the corners bordering the outboard sides.

5. The vehicle frame of claim 4, wherein each reinforcement extends along one of the corners.

6. The vehicle frame of claim 5, wherein each reinforcement extends along one of the corners bordering the top sides.

7. The vehicle frame of claim 6, wherein the notches are first notches, further comprising a second notch on the exterior surface of both frame rails.

8. The vehicle frame of claim 7, wherein each first notch is disposed on one of the corners bordering the corresponding top side and the corresponding outboard side, and each second notch is disposed on one of the corners bordering the corresponding bottom side and the corresponding outboard side.

9. The vehicle frame of claim 8, wherein each first notch is positioned in a vehicle-forward position from the second notch on the corresponding frame rail.

10. The vehicle frame of claim 9, wherein the reinforcements are first reinforcements, further comprising a second reinforcement extending along each interior surface positioned in the vehicle-rearward direction from the notches.

11. The vehicle frame of claim 10, wherein each first reinforcement is disposed on one of the corners bordering the respective top side and the respective outboard side, and each second reinforcement is disposed on one of the corners bordering the respective top side and the respective inboard side.

12. The vehicle frame of claim 11, wherein each first reinforcement is positioned in a vehicle-outboard direction from the second reinforcement of the corresponding frame rail.

13. The vehicle frame of claim 1, wherein the notches extend through the walls of the frame rails.

14. The vehicle frame of claim 1, wherein the reinforcements are positioned to limit deformation initiated by the notches during a collision.

15. The vehicle frame of claim 1, wherein each frame rail includes a curved-upward section and a straight section extending in a vehicle-rearward direction from the curved-upward section, and wherein each notch is disposed on one of the curved-upward sections.

16. The vehicle frame of claim 15, wherein each reinforcement is disposed on one of the straight sections.

17. The vehicle frame of claim 1, further comprising a cab mount bracket fixed to each frame rail in the vehicle-rearward direction from the notches.

18. The vehicle frame of claim 17, wherein each cab mount bracket is positioned in a vehicle-outward direction relative to the corresponding reinforcement.

19. The vehicle frame of claim 1, wherein the frame rails are farther apart in the vehicle-rearward direction from the notches than opposite the vehicle-rearward direction from the notches.

20. The vehicle frame of claim 19, further comprising a crossbeam extending from one of the frame rails to the other of the frame rails and positioned in the vehicle-rearward direction from the reinforcements.

* * * * *